United States Patent
Serizawa et al.

(10) Patent No.: US 11,777,147 B2
(45) Date of Patent: Oct. 3, 2023

(54) LITHIUM ION SECONDARY BATTERY

(71) Applicant: NEC CORPORATION, Tokyo (JP)

(72) Inventors: Shin Serizawa, Tokyo (JP); Suguru Tamai, Tokyo (JP); Kazuhiko Inoue, Tokyo (JP)

(73) Assignee: NEC CORPORATION, Tokyo (JP)

(*) Notice: Subject to any disclaimer, the term of this patent is extended or adjusted under 35 U.S.C. 154(b) by 452 days.

(21) Appl. No.: 16/760,242

(22) PCT Filed: Oct. 31, 2018

(86) PCT No.: PCT/JP2018/040498
§ 371 (c)(1),
(2) Date: Apr. 29, 2020

(87) PCT Pub. No.: WO2019/088166
PCT Pub. Date: May 9, 2019

(65) Prior Publication Data
US 2021/0210785 A1 Jul. 8, 2021

(30) Foreign Application Priority Data

Nov. 1, 2017 (JP) ................................ 2017-211661

(51) Int. Cl.
| | | |
|---|---|---|
| H01M 10/0567 | (2010.01) | |
| H01M 4/04 | (2006.01) | |
| H01M 4/36 | (2006.01) | |
| H01M 4/38 | (2006.01) | |
| H01M 4/525 | (2010.01) | |
| H01M 4/583 | (2010.01) | |
| H01M 4/62 | (2006.01) | |
| H01M 4/66 | (2006.01) | |
| H01M 10/0525 | (2010.01) | |
| H01M 10/0568 | (2010.01) | |
| H01M 10/0565 | (2010.01) | |
| H01M 10/0569 | (2010.01) | |
| H01M 4/02 | (2006.01) | |

(52) U.S. Cl.
CPC ..... *H01M 10/0567* (2013.01); *H01M 4/0404* (2013.01); *H01M 4/0426* (2013.01); *H01M 4/0428* (2013.01); *H01M 4/366* (2013.01); *H01M 4/386* (2013.01); *H01M 4/525* (2013.01); *H01M 4/583* (2013.01); *H01M 4/622* (2013.01); *H01M 4/662* (2013.01); *H01M 10/0525* (2013.01); *H01M 10/0565* (2013.01); *H01M 10/0568* (2013.01); *H01M 10/0569* (2013.01); *H01M 2004/027* (2013.01); *H01M 2300/0028* (2013.01)

(58) Field of Classification Search
None
See application file for complete search history.

(56) References Cited

U.S. PATENT DOCUMENTS

| | | | |
|---|---|---|---|
| 2013/0260223 A1 | 10/2013 | Jeong et al. | |
| 2018/0097235 A1 | 4/2018 | Yang et al. | |

FOREIGN PATENT DOCUMENTS

| | | | |
|---|---|---|---|
| CN | 101286560 A | 10/2008 | |
| CN | 101855771 A | 10/2010 | |
| CN | 102447112 A | 5/2012 | |
| CN | 103384932 A | 11/2013 | |
| CN | 103560233 A | 2/2014 | |
| CN | 2015-018692 A | 1/2015 | |
| CN | 105580173 A | 5/2016 | |
| CN | 105633460 A | 6/2016 | |
| JP | 9-289022 | * 11/1997 | |
| JP | H09-289022 A | 11/1997 | |
| JP | 11-040194 A | 2/1999 | |
| JP | 11-111334 | * 4/1999 | |
| JP | 11-111334 A | 4/1999 | |
| JP | 2000-182673 A | 6/2000 | |
| JP | 2001-185212 A | 7/2001 | |
| JP | 2002-075331 A | 3/2002 | |
| JP | 2009-206081 A | 9/2009 | |
| JP | 2011-503795 | * 1/2011 | |
| JP | 2011-503795 A | 1/2011 | |
| JP | 2011-049046 A | 3/2011 | |
| JP | 2012-054198 A | 3/2012 | |
| JP | 2012-064574 A | 3/2012 | |
| JP | 2012-204203 A | 10/2012 | |
| JP | 2013-137873 A | 7/2013 | |
| JP | 2013-175316 A | 9/2013 | |
| JP | 2014-203771 A | 10/2014 | |
| JP | 2015-195167 A | 11/2015 | |
| WO | 2004/004031 A1 | 1/2004 | |
| WO | 2006/075446 A1 | 7/2006 | |
| WO | 2013/027289 A1 | 2/2013 | |
| WO | 2013/114788 A1 | 8/2013 | |
| WO | 2014/207967 A1 | 12/2014 | |

OTHER PUBLICATIONS

International Search Report for PCT/JP2018/040498 dated Dec. 4, 2018 [PCT/ISA/210].
Japanese Office Action for JP Application No. 2019-550453 dated Mar. 30, 2021 with English Translation.
Japanese Office Communication for JP Application No. 2019-550453 dated Jan. 11, 2022 with English Translation.
Chinese Office Action for CN Application No. 201880070600.1, dated Oct. 21, 2022 with English Translation.

\* cited by examiner

*Primary Examiner* — Laura Weiner
(74) *Attorney, Agent, or Firm* — Sughrue Mion, PLLC

(57) ABSTRACT

Deterioration in cycle characteristics and battery swelling are improved. The lithium ion secondary battery of the present invention is characterized in comprising an electrolyte solution comprising a multifunctional monomer comprising two or more epoxy groups and a negative electrode comprising a binder comprising a polymer comprising a monomer unit comprising a functional group selected from the group consisting of —OH, —OM, —COOH, —COOM and —COOC$_n$H$_{2n+1}$, wherein M is a metal element, and n is an integer of 1 to 5.

7 Claims, 1 Drawing Sheet

LITHIUM ION SECONDARY BATTERY

CROSS REFERENCE TO RELATED APPLICATIONS

This application is a National Stage of International Application No. PCT/JP2018/040498 filed Oct. 31, 2018, claiming priority based on Japanese Patent Application No. 2017-211661 filed Nov. 1, 2017, and the entire disclosure of which is hereby incorporated by reference.

TECHNICAL FIELD

The present invention relates to a lithium ion secondary battery, a manufacturing method thereof and a vehicle equipped with a lithium ion secondary battery.

BACKGROUND ART

Lithium ion secondary batteries have advantages such as high energy density, low self-discharge, excellent long-term reliability, and therefore have been put into practical use in notebook-type personal computers, mobile phones and the like. Furthermore, in recent years, because of expansion of the market for motor-driven vehicles, such as electric vehicles and hybrid vehicles, and acceleration of development of home and industrial power storage systems in addition to highly functionalizing electronic devices, there is a demand for a high performance lithium ion secondary battery which is excellent in battery characteristics such as cycle characteristics and storage characteristics and is further improved in capacity and energy density.

In general, a negative electrode active material of the lithium ion secondary battery expands/contracts when it intercalates/de-intercalates lithium ions. The negative electrode active material may crack or may fall off of an electrode due to repetitive expansion/contraction. Thereby, the negative electrode active material reacts with the electrolyte solution, causing the electrolyte to decompose. As a result, cycle characteristics of the lithium ion secondary battery may deteriorate. In addition, the battery may expand due to gas generated by decomposition of the electrolyte solution. In particular, metal-based active materials, such as alloys and metal oxides, have high capacity, but they swell and shrink significantly, easily causing these problems.

To solve these problems, there is a demand for a binder having high bonding strength that can resist the volume change of the active material. Polyacrylic acid and polyimide are known as such binders. Patent Document 1 discloses that a polyacrylic acid binder is used in a negative electrode comprising active materials with large volume change, such as silicon and tin. Patent Document 2 discloses that a polyimide binder is used in a negative electrode comprising a silicon material.

CITATION LIST

Patent Literature

Patent Document 1: WO2006/075446
Patent Document 2: WO2004/004031

SUMMARY OF INVENTION

Technical Problem

Even the above binders have had the problem of the deterioration in cycle characteristics and the battery swelling. A purpose of the present invention is to provide a lithium ion secondary battery which solves any of the above problems.

Solution to Problem

The first lithium ion secondary battery according to the present invention comprises an electrolyte solution comprising a multifunctional monomer comprising two or more epoxy groups and a negative electrode comprising a binder comprising a polymer comprising a monomer unit comprising a functional group selected from the group consisting of —OH, —OM, —COOH, —COOM and —COOC$_n$H$_{2n+1}$, wherein M is a metal element, and n is an integer of 1 to 5.

Advantageous Effects of Invention

According to the present invention, it is possible to provide a lithium ion secondary battery which has improved cycle characteristics and in which battery swelling is reduced.

DESCRIPTION OF EMBODIMENTS

Figure 1:
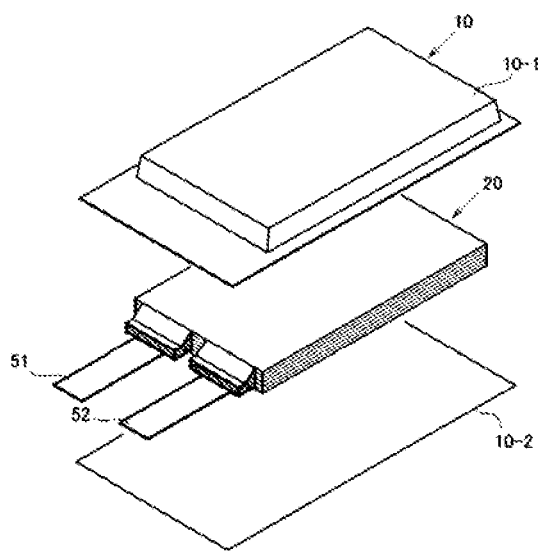
FIG. 1 is an exploded perspective view showing a basic structure of a film package battery.

Hereinafter, one example of the lithium ion secondary battery of the present embodiment will be described for each component.

<Electrolyte Solution>

The electrolyte solution comprises a solvent, a supporting salt and an additive.

The additive comprises a multifunctional monomer comprising two or more epoxy groups. The epoxy group can react with a functional group contained in a polymer used as a binder in the negative electrode to form a crosslinking structure. Hereby, the binding strength of the binder can be improved. For this reason, cycle characteristics of the battery are improved, and battery swelling is suppressed. The number of the epoxy groups in the multifunctional monomer is preferably 2 or more and 4 or less.

The molecular weight of the multifunctional monomer is not particularly limited, but is preferably 5000 or less, more preferably 3000 or less and still more preferably 1000 or less, and is preferably 100 or more and more preferably 150 or more.

The multifunctional monomer may comprise an ether bond, a carbonyl group or the like in addition to the epoxy group. The multifunctional monomer is preferably an aliphatic epoxy compound. Also, the multifunctional monomer may be an alicyclic epoxy compound such as that comprising an epoxycyclohexyl group represented by the following structural formula (21).

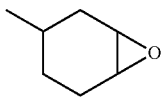

Formula (21)

Examples of the multifunctional monomer include bifunctional monomers, such as 1,4-butanediol diglycidyl ether, 1,6-hexanediol diglycidyl ether, ethylene glycol diglycidyl ether, diethylene glycol diglycidyl ether, polyethylene glycol diglycidyl ether, propylene glycol diglycidyl ether, tripropylene glycol diglycidyl ether, polypropylene glycol diglycidyl ether, neopentyl glycol diglycidyl ether, 1,6-hexanediol diglycidyl ether, glycerin diglycidyl ether, trimethylolpropane triglycidyl ether, hydrogenated bisphenol A diglycidyl ether, 1,4-cyclohexanedimethanol diglycidyl ether, 3,4-epoxycyclohexylmethyl(3,4-epoxy)cyclohexane carboxylate and epsilon-caprolactone-modified 3,4-epoxycyclohexylmethyl 3',4'-epoxycyclohexane carboxylate; trifunctional monomers, such as glycerol triglycidyl ether and trimethylolpropane polyglycidyl ether; and tetrafunctional monomers, such as sorbitol polyglycidyl ether, epoxylated butanetetracarboxylate tetrakis(3-cyclohexenylmethyl) modified epsilon-caprolactone. These may be used alone or in combination of two or more.

The content of the multifunctional monomer may be properly determined according to the amount of functional groups in the polymer that is used as a binder. In general, the concentration of the multifunctional monomer in the electrolyte solution is preferably 0.001 mol/L or more and more preferably 0.005 mol/L or more, and is preferably 1 mol/L or less and more preferably 0.1 mol/L or less.

Other additives may be used in combination with the multifunctional monomer comprising two or more epoxy groups. Other additives are not particularly limited, and conventional additives used in an electrolytic solution may be used. Examples of other additives include cyclic disulfonates, such as methylene methane disulfonate (MMDS) represented by the following formula (1), ethylene methane disulfonate, and propane methane disulfonate, cyclic sulfonates, such as 1,3-propane sultone, propene sultone, and butane sultone, cyclic sulfones, such as sulfolane, cyclic halogenated carbonates, such as fluoroethylene carbonate (FEC) represented by the following formula (2), trifluoromethyl propylene carbonate, and chloroethylene carbonate, unsaturated carbonates, such as vinylene carbonate (VC), vinyl ethylene carbonate, phenylene carbonate, and allyl methyl carbonate (AMC), acid anhydrides, such as maleic anhydride, succinic anhydride, and phthalic anhydride, cyclic imides, such as succinimide, lithium bisoxalate borate (LiBOB) represented by the following formula (3), lithium difluoro oxalate borate (LiBF$_2$(C$_2$O$_4$)), sulfites, such as ethylene sulfite (ES), vinyl ethylene sulfite, butylene sulfite, dimethyl sulfite, and diethyl sulfite, unsaturated esters, such as vinyl acetate and divinyl adipate (ADV), glycolides, such as dimethyl glycolide and tetramethyl glycolide, and cyanofuran.

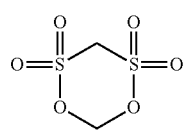

(1)

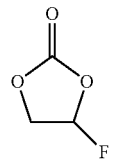

(2)

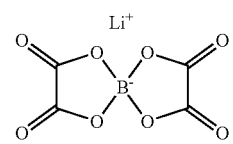

(3)

Examples of the solvent include, but not particularly limited to, aprotic organic solvents including cyclic carbonates such as propylene carbonate (PC), ethylene carbonate (EC) and butylene carbonate (BC), open-chain carbonates such as dimethyl carbonate (DMC), diethyl carbonate (DEC), ethyl methyl carbonate (MEC) and dipropyl carbonate (DPC), propylene carbonate derivatives, aliphatic carboxylic acid esters such as methyl formate, methyl acetate and ethyl propionate, ethers such as diethyl ether and ethyl propyl ether, phosphoric acid esters such as trimethyl phosphate, triethyl phosphate, tripropyl phosphate, trioctyl phosphate and triphenyl phosphate, fluorinated aprotic organic solvents obtainable by substituting at least part of hydrogen atoms of these compounds with fluorine atom(s), and the like.

Among them, a cyclic or open-chain carbonate(s) such as ethylene carbonate (EC), propylene carbonate (PC), butylene carbonate (BC), dimethyl carbonate (DMC), diethyl carbonate (DEC), ethyl methyl carbonate (MEC), dipropyl carbonate (DPC) or the like is preferably contained.

The solvents may be used alone, or in combination of two or more

The supporting salt is not particularly limited except that it comprises Li. Examples of the supporting salt include LiPF$_6$, LiAsF$_6$, LiAlCl$_4$, LiClO$_4$, LiBF$_4$, LiSbF$_6$, LiCF$_3$SO$_3$, LiC$_4$F$_9$SO$_3$, LiC(CF$_3$SO$_2$)$_3$, LiN(FSO$_2$)$_2$, LiN(CF$_3$SO$_2$)$_2$, LiN(C$_2$F$_5$SO$_2$)$_2$, LiB$_{10}$Cl$_{10}$ and the like. Besides these, the supporting salt includes lower aliphatic lithium carboxylate, chloroboran lithium, lithium tetraphenylborate, LiBr, LiI, LiSCN, LiCl and the like. The supporting salts may be used alone or in combination of two or more.

The concentration of the supporting salt in the electrolyte solution is preferably 0.5 to 1.5 mol/L. When the concentration of the supporting salt is within this range, it is easy to adjust the density, viscosity and electric conductivity to appropriate ranges.

<Negative Electrode>

The negative electrode comprises a current collector and a negative electrode mixture layer comprising a negative electrode active material and a binder.

The negative electrode active material is not particularly limited. Examples thereof include carbon materials capable of absorbing and desorbing lithium ions (a), metals capable of being alloyed with lithium (b), and metal oxides capable of absorbing and desorbing lithium ions (c).

As the carbon material (a), graphite, amorphous carbon, diamond-like carbon, carbon nanotubes, or composites thereof can be used. Graphite having high crystallinity has high electrical conductivity and has excellent adhesiveness to a negative electrode current collector formed of a metal, such as copper, and excellent voltage flatness. On the other hand, in amorphous carbon having low crystallinity, the volume expansion is relatively small, and therefore, the effect of relieving the volume expansion of the entire negative electrode is large, and deterioration caused by nonuniformity, such as grain boundaries and defects, does not occur easily. The carbon material (a) can be used alone or in combination with other materials.

As the metal (b), a metal mainly composed of Al, Si, Pb, Sn, Zn, Cd, Sb, In, Bi, Ag, Ba, Ca, Hg, Pd, Pt, Te, La, and the like, or alloys of two or more of these, or alloys of these metals or alloys with lithium, or the like can be used. Particularly, the metal (b) preferably comprises silicon (Si). The metal (b) may be used alone or in combination with other materials.

As the metal oxide (c), silicon oxide (for example, $SiO$ and $SiO_2$), aluminum oxide, tin oxide (for example, $SnO$ and $SnO_2$), indium oxide, zinc oxide, lithium oxide, $LiFe_2O_3$, $WO_2$, $MoO_2$, $CuO$, $Nb_3O_5$, $Li_xTi_{2-x}O_4$ ($1 \leq x \leq 4/3$), $PbO_2$, $Pb_2O_5$ or composites thereof can be used. Particularly, the metal oxide (c) preferably comprises silicon oxide. This is because silicon oxide is relatively stable and does not easily cause reactions with other compounds. In addition, one or two or more elements selected from nitrogen, boron, and sulfur can also be added to the metal oxide (c), for example, in an amount of 0.1 to 5% by weight. By doing this, the electrical conductivity of the metal oxide (c) may be improved. The metal oxide (c) may be used alone or in combination with other materials.

Among these, silicon materials (materials comprising silicon, such as Si, silicon alloys, silicon oxides) having large capacity are particularly preferred as the negative electrode active materials. In one embodiment, the silicon material may be used in combination with a carbon material such as graphite. The silicon materials largely expand and contract at the time of insertion and desorption of Li, and thereby electrical contact between active materials may be broken in some cases. The use of the carbon material together with the silicon material makes it possible to maintain the electrical contact, leading to a battery with excellent cycle characteristics and high energy density. A negative electrode active material in which silicon material particles and carbon material particles are mixed may be used, and a negative electrode active material in which surfaces of silicon material particles are coated with the carbon may be used. Since the binder comprising the predetermined functional groups according to the present embodiment has good adhesive property to carbon materials, silicon material particles coated with the carbon material are preferred. The content of the silicon material is preferably 10 weight % or more, more preferably 30 weight % or more, still more preferably 60 weight % or more, and may even be 100 weight %, based on the total amount of the negative electrode active material. The average particle size of the silicon material is preferably 0.1 μm or more and 10 μm or less, and more preferably 0.2 μm or more and 8 μm or less. When the particle size is too small, the reactivity with the electrolyte solution may be increased, causing drop in life characteristics. When the particle size is too large, the particles easily crack at the time of absorbing and desorbing lithium ions, and the lifespan may be decreased. The average particle size represents a particle size at 50% in a volumetric based cumulative distribution (50% particle size). The average particle size can be measured by a laser diffraction type particle size distribution measuring apparatus.

The binder according to the present embodiment comprises a polymer comprising a monomer unit comprising a functional group selected from the group consisting of —OH, —OM, —COOH, —COOM and —COO$C_nH_{2n+1}$, wherein M is a metal element, and n is an integer of 1 to 5. Examples of the metal element represented by M include, but not particularly limited to, alkali metals (for example, Na, Li, K and the like) and monovalent precious metals (for example, Ag, Au, Cu and the like). n is an integer of 1 to 5, but is preferably 1 to 3, and more preferably 1 or 2. The adhesion ability to active materials can be increased with these functional groups. Also, these functional groups may react with the electrolyte additive comprising two or more epoxy groups to form a crosslinking structure. Thereby, the adhesion ability of the binder may be further increased.

The ratio of the monomer unit comprising a functional group selected from the group consisting of —OH, —OM, —COOH, —COOM and —COO$C_nH_{2n+1}$, wherein M is a metal element, and n is an integer of 1 to 5, is not particularly limited, but to improve the adhesive ability, the ratio thereof in the total monomer units is preferably 10 mol % or more, more preferably 50 mol % or more, still more preferably 80 mol % or more, and may even be 100 mol %.

Examples of the polymer comprising a monomer unit comprising such a functional group include polyvinyl alcohol, poly(meth)acrylic acid, poly(meth)acrylate, polyimide, polyamide-imide and the like. It is noted that herein, the term, "(meth)acrylic acid" means acrylic acid and methacrylic acid.

The polyvinyl alcohol comprises a monomer unit derived from vinyl alcohol or a metal alkoxide thereof. As the metal, an alkali metal (for example, Na, Li, K or the like) is preferred.

The poly(meth)acrylic acid comprises a monomer unit derived from (met)acrylic acid or a metal salt thereof, including a monomer unit represented by the following formula (4).

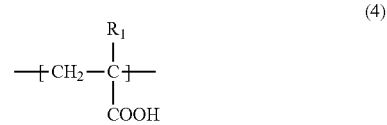

wherein $R_1$ is a hydrogen atom or a methyl group.

The carboxylic acid in a monomer unit represented by formula (4) may be a carboxylic acid salt, such as a carboxylic acid metal salt. The metal is preferably a monovalent metal. Examples of the monovalent metal include alkali metals (for example, Na, Li, K, Rb, Cs, Fr and the like) and precious metals (for example, Ag, Au, Cu and the like) and the like. When the polyacrylic acid contains the carboxylic acid salt in at least some monomer units, the adhesiveness to constituent materials of the negative electrode mixture layer may be further improved in some cases.

The poly(meth)acrylate comprises a monomer unit derived from a (meth)acrylate represented by the following formula (5).

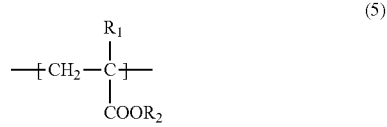

wherein $R_1$ is a hydrogen atom or a methyl group, and $R_2$ is an alkyl group having 1 to 5 carbon atoms.

The polyvinyl alcohol, poly(meth)acrylic acid and poly(meth)acrylate may be copolymers comprising two or more types of monomer units. For example, the polyvinyl alcohol or the poly(meth)acrylic acid may be a copolymer comprising a monomer unit comprising —OH or —OM and a monomer unit comprising —COOH or —COOM. That is, the polyvinyl alcohol or the poly(meth)acrylic acid may comprise a monomer unit derived from vinyl alcohol or a metal alkoxide thereof and a monomer unit derived from (met)acrylic acid or a metal salt thereof. The adhesive ability to active materials may be increased when multiple types of functional groups are contained. Also, a monomer unit other than the above monomer units may be contained. Examples of other monomer units include monomer units derived from monomers such as acids having ethylenically unsaturated group, for example, monocarboxylic acid compounds such as crotonic acid and pentenoic acid, dicarboxylic acid compounds such as itaconic acid and maleic acid, sulfonic acid compounds such as vinylsulfonic acid, and phosphonic acid compounds such as vinylphosphonic acid; aromatic olefins having acidic group such as styrene sulfonic acid and styrene carboxylic acid; acrylonitrile; aliphatic olefins such as ethylene, propylene, and butadiene; aromatic olefins such as styrene; and the like.

In general, the polyimide and the polyamide-imide can be obtained by cyclization (imidization) of a polyamic acid that is a precursor. The polyimide and the polyamide-imide according to the present embodiment partially comprise a monomer unit which is not ring-closed. That is, a monomer unit represented by any of the following formulae (6) to (8) is contained.

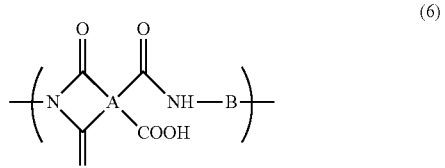

(6)

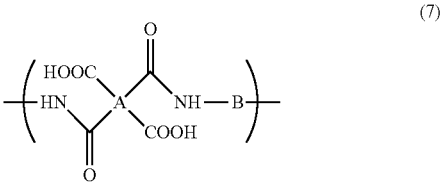

(7)

wherein A is a tetravalent group obtained by removing acid anhydride groups from a tetracarboxylic dianhydride, and B is a divalent group obtained by removing amino groups from a diamine.

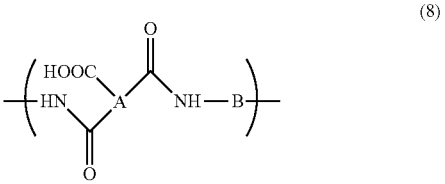

(8)

wherein A is a trivalent group obtained by removing a carboxyl group and an acid anhydride group from a tricarboxylic anhydride, and B is a divalent group obtained by removing amino groups from a diamine.

Examples of the tetracarboxylic acid dianhydride for forming A include aromatic tetracarboxylic acid dianhydrides, such as 3,3',4,4'-biphenyltetracarboxylic dianhydride, pyromellitic dianhydride, 3,4'-oxydiphthalic anhydride, 4,4'-oxydiphthalic anhydride and 3,3',4,4'-benzophenonetetracarboxylic dianhydride; and aliphatic tetracarboxylic acid dianhydrides, such as cyclobutanetetracarboxylic dianhydride, 1,2,3,4-cyclopentanetetracarboxylic dianhydride, 1,2,4,5-cyclohexanetetracarboxylic dianhydride, bicyclo[2.2.1]heptane-2,3,5,6-tetracarboxylic dianhydride and 1,2,3,4-butanetetracarboxylic dianhydride.

Examples of the tricarboxylic anhydride for forming A include trimellitic anhydride, cyclohexane-1,2,4-tricarboxylic acid 1,2-anhydride, 3,4,4'-biphenyltricarboxylic anhydride and 3,4,4'-diphenylmethanetricarboxylic anhydride.

Examples of the diamine for forming B include aromatic diamines, such as p-phenylenediamine, m-phenylenediamine, p-xylylenediamine and m-xylylenediamine; and aliphatic diamines, such as cyclohexanediamine, di(aminomethyl)cyclohexane, bis(aminomethyl)bicycloheptane, and diaminomethyloxybicycloheptane.

The polyimide and the polyamide-imide may comprise a monomer unit which has been fully ring-closed. In the polyimide and the polyamide-imide, the ratio of the monomer units represented by any of formulae (6) to (8) in the total monomer units is preferably 1 mol % or more 70 mol % or less, and more preferably κ mol % or more and 20 mol % or less. The ratio of these monomer units can be determined with NMR or FTIR. For example, a polymic acid is imidized by heat, and the imidization ratio may be adjusted in accordance with the processing temperature. It is preferable to shorten the processing time or to set the processing temperature to a low temperature of 80° C. to 200° C. such that the polyimide or the polyamide-imide comprises a monomer unit represented by any of formulae (6) to (8). In general, the heat-treatment is conducted after a negative electrode slurry comprising a polyamic acid is applied to a current collector.

The amount of the binder is preferably 0.5 to 20 parts by weight based on 100 parts by weight of the negative electrode active material from the viewpoint of sufficient binding strength and high energy density that are in a trade-off relation with each other.

For the negative electrode mixture layer, a conductive assisting agent may be added for the purpose of lowering the impedance. Examples of the conductive assisting agent include, flake-like, soot, and fibrous carbon fine particles and the like, for example, graphite, carbon black, acetylene black, vapor grown carbon fibers and the like.

As the negative electrode current collector, from the viewpoint of electrochemical stability, aluminum, nickel, stainless steel, chrome, copper, silver, or an alloy thereof may be used. As the shape thereof, foil, flat plate, mesh and the like are exemplified.

The negative electrode according to the present embodiment may be prepared, for example, by preparing a negative electrode slurry comprising the negative electrode active material, the binder and a solvent and applying this to the negative electrode current collector to form the negative electrode mixture layer. Examples of a method for forming the negative electrode mixture layer include a doctor blade method, a die coater method, a CVD method, a sputtering method, and the like. After forming the negative electrode mixture layer in advance, a thin film of aluminum, nickel or an alloy thereof as a negative electrode current collector may be formed thereon by a method such as vapor deposition or sputtering, to prepare a negative electrode.

<Positive Electrode>

The positive electrode comprises a current collector and a positive electrode mixture layer comprising a positive electrode active material and a binder.

The positive electrode active material may be selected from some viewpoints. From the viewpoint of high energy density, it is preferable to contain a compound having high capacity. Examples of the high capacity compound include lithium nickelate ($LiNiO_2$) and lithium nickel composite oxides in which a part of the Ni of lithium nickelate is replaced by another metal element, and layered lithium nickel composite oxides represented by the following formula (C) are preferred.

$$Li_yNi_{(1-x)}M_xO_2 \quad (C)$$

wherein $0 \leq x < 1$, $0 < y \leq 1.2$, and M is at least one element selected from the group consisting of Co, Al, Mn, Fe, Ti, and B.

From the viewpoint of high capacity, it is preferred that the content of Ni is high, that is, x is less than 0.5, further preferably 0.4 or less in the formula (C). Examples of such compounds include $Li_\alpha Ni_\beta Co_\gamma Mn_\delta O_2$ ($0<\alpha \leq 1.2$, preferably $1 \leq \alpha \leq 1.2$, $\beta+\gamma+\delta=1$, $\beta \geq 0.7$, and $\gamma \leq 0.2$) and $Li_\alpha Ni_\beta Co_\gamma Al_\delta O_2$ ($0<\alpha \leq 1.2$, preferably $1 \leq \alpha \leq 1.2$, $\beta+\gamma+\delta=1$, $\beta \geq 0.6$, preferably $\beta \geq 0.7$, and $\gamma \leq 0.2$) and particularly include $LiNi_\beta Co_\gamma Mn_\delta O_2$ ($0.75 \leq \beta \leq 0.85$, $0.05 \leq \gamma \leq 0.15$, and $0.10 \leq \delta \leq 0.20$). More specifically, for example, $LiNi_{0.8}Co_{0.05}Mn_{0.15}O_2$, $LiNi_{0.8}Co_{0.1}Mn_{0.1}O_2$, $LiNi_{0.8}Co_{0.15}Al_{0.05}O_2$, and $LiNi_{0.8}Co_{0.1}Al_{0.1}O_2$ may be preferably used.

From the viewpoint of thermal stability, it is also preferred that the content of Ni does not exceed 0.5, that is, x is 0.5 or more in the formula (C). In addition, it is also preferred that particular transition metals do not exceed half. Examples of such compounds include $Li_\alpha Ni_\beta Co_\gamma Mn_\delta O_2$ ($0<\alpha \leq 1.2$, preferably $1 \leq \alpha \leq 1.2$, $\beta+\gamma+\delta=1$, $0.2 \leq \beta \leq 0.5$, $0.1 \leq \gamma \leq 0.4$, and $0.1 \leq \delta \leq 0.4$). More specific examples may include $LiNi_{0.4}Co_{0.3}Mn_{0.3}O_2$ (abbreviated as NCM433), $LiNi_{1/3}Co_{1/3}Mn_{1/3}O_2$, $LiNi_{0.5}Co_{0.2}Mn_{0.3}O_2$ (abbreviated as NCM523), and $LiNi_{0.5}Co_{0.3}Mn_{0.2}O_2$ (abbreviated as NCM532) (also including those in which the content of each transition metal fluctuates by about 10% in these compounds).

In addition, two or more compounds represented by the formula (C) may be mixed and used, and, for example, it is also preferred that NCM532 or NCM523 and NCM433 are mixed in the range of 9:1 to 1:9 (as a typical example, 2:1) and used. Further, by mixing a material in which the content of Ni is high (x is 0.4 or less in the formula (C)) and a material in which the content of Ni does not exceed 0.5 (x is 0.5 or more, for example, NCM433), a battery having high capacity and high thermal stability can also be formed.

The layered lithium nickel composite oxide may be further substituted with another metal element. For example, a layered lithium nickel composite oxide represented by the following formula (D) may be preferably used.

$$Li_a Ni_b Co_c M1_d M2_e O_f \quad (D)$$

wherein $0.8 \leq a \leq 1.2$, $0.5 \leq b < 1.0$, $0.005 \leq c \leq 0.4$, $0.005 \leq d \leq 0.4$, $0 \leq e < 0.1$, $1.8 \leq f \leq 2.3$, $b+c+d+e=1$, M1 is Mn or Al, and M2 is one or more metals selected from the group consisting of B, Na, Mg, Al, S, K, Ca, Ti, V, Cr, Fe, Cu, Zn, Zr, Nb, Mo, Sn, Pb and W.

Examples of the positive electrode active materials other than the above include lithium manganate having a layered structure or a spinel structure such as $LiMnO_2$, $Li_xMn_2O_4$ ($0<x<2$), $Li_2MnO_3$, $xLi_2MnO_3$-$(1-x)LiMO_2$ ($0.1<x<0.8$, and M is one or more elements selected from the group consisting of Mn, Fe, Co, Ni, Ti, Al and Mg) and $Li_xMn_{1.5}Ni_{0.5}O_4$ ($0<x<2$); $LiCoO_2$ or materials in which a part of the transition metal in this material is replaced by other metal(s); materials in which Li is excessive as compared with the stoichiometric composition in these lithium transition metal oxides; materials having an olivine structure such as $LiFePO_4$; and the like. In addition, materials in which these metal oxides are partially substituted by Al, Fe, P, Ti, Si, Pb, Sn, In, Bi, Ag, Ba, Ca, Hg, Pd, Pt, Te, Zn, La or the like are also usable. The positive electrode active materials described above may be used alone or in combination of two or more.

The binder is not particularly limited, and polyvinylidene fluoride, vinylidene fluoride-hexafluoropropylene copolymer, vinylidene fluoride-tetrafluoroethylene copolymer, polytetrafluoroethylene, polypropylene, polyethylene, polybutadiene, polyacrylic acid, polyacrylic ester, polystyrene, polyacrylonitrile, polyimide, polyamide-imide and the like may be used. Also, the binder may be a mixture, a copolymer or a cross-linked body of a plurality of the above resins, for example, styrene butadiene rubber (SBR). When an aqueous binder such as an SBR emulsion is used, a thickener such as carboxymethyl cellulose (CMC) can also be used. The lower limit of the amount of the binder is preferably 1 part by weight or more, and more preferably 2 parts by weight or more, and the upper limit is preferably 30 parts by weight or less, and more preferably 25 parts by weight or less, based on 100 parts by weight of the positive electrode active material.

For the positive electrode mixture layer, a conductive assisting agent may be added for the purpose of lowering the impedance. Examples of the conductive assisting agent include flake-like, soot, and fibrous carbon fine particles and the like, for example, graphite, carbon black, acetylene black, vapor grown carbon fibers and the like.

As the positive electrode current collector, from the view point of electrochemical stability, aluminum, nickel, copper, silver, and alloys thereof are preferred. As the shape thereof, foil, flat plate, mesh and the like are exemplified. In particular, a current collector with aluminum, an aluminum alloy, or an iron-nickel-chromium-molybdenum based stainless steel is preferable.

The positive electrode according to the present embodiment may be prepared, for example, by preparing a positive electrode slurry comprising the positive electrode active material, the binder and a solvent and applying this to the positive electrode current collector to form the positive electrode mixture layer. Examples of a method of forming the positive electrode mixture layer include a doctor blade method, a die coater method, a CVD method, a sputtering method, and the like. After forming the positive electrode mixture layer in advance, a thin film of aluminum, nickel or an alloy thereof as a positive electrode current collector may be formed thereon by a method such as vapor deposition or sputtering, to prepare a positive electrode.

<Separator>

The separator may be of any type as long as it has durability against the electrolyte solution. Specific examples of a material thereof include polyolefins such as polypropylene and polyethylene, cellulose, polyesters such as polyethylene terephthalate and polybutylene terephthalate, polyimide, polyamide-imide, polyvinylidene fluoride, aromatic polyamides (aramid) such as polymetaphenylene isophthalamide, polyparaphenylene terephthalamide and copolyparaphenylene 3,4'-oxydiphenylene terephthalamide, and the like. These can be used as porous films, woven fabrics, nonwoven fabrics or the like.

<Insulation Layer>

An insulation layer may be formed on a surface of the positive electrode, the negative electrode and the separator. Examples of a method for forming the insulation layer include a doctor blade method, a die coater method, a CVD method, a sputtering method, and the like. The insulation layer may be formed at the same time as forming the positive electrode mixture layer, negative electrode mixture layer or separator. Materials constituting the insulation layer include a mixture of an insulating filler such as aluminum oxide or barium titanate and a binder such as styrene butadiene rubber or polyvinylidene fluoride.

<Structure of Secondary Battery>

Figure 2:
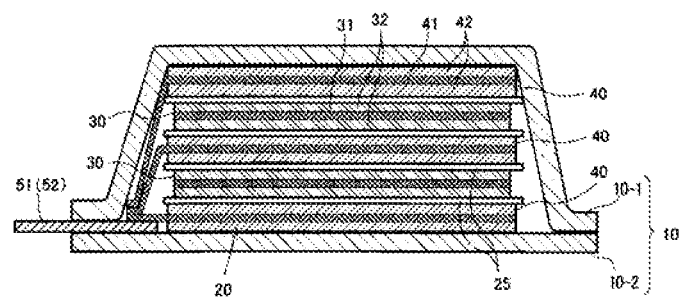
FIG. 2 is a cross-sectional view schematically showing a cross section of the battery of FIG. 1.

The lithium ion secondary battery according to the present embodiment may have, for example, a structure as shown in FIGS. 1 and 2. This lithium ion secondary battery comprises a battery element 20, a film outer package 10 housing the battery element 20 together with an electrolyte, and a positive electrode tab 51 and a negative electrode tab 52 (hereinafter these are also simply referred to as "electrode tabs").

In the battery element 20, a plurality of positive electrodes 30 and a plurality of negative electrodes 40 are alternately stacked with separators 25 sandwiched therebetween as shown in FIG. 2. In the positive electrode 30, an electrode material 32 is applied to both surfaces of a metal foil 31, and also in the negative electrode 40, an electrode material 42 is applied to both surfaces of a metal foil 41 in the same manner. The present invention is not necessarily limited to stacking type batteries and may also be applied to batteries such as a winding type.

As shown in FIGS. 1 and 2, the lithium ion secondary battery according to the present embodiment may have an arrangement in which the electrode tabs are drawn out to one side of the outer package, but the electrode tab may be drawn out to both sides of the outer package. Although detailed illustration is omitted, the metal foils of the positive electrodes and the negative electrodes each have an extended portion in part of the outer periphery. The extended portions of the negative electrode metal foils are brought together into one and connected to the negative electrode tab 52, and the extended portions of the positive electrode metal foils are brought together into one and connected to the positive electrode tab 51 (see FIG. 2). The portion in which the extended portions are brought together into one in the stacking direction in this manner is also referred to as a "current collecting portion" or the like.

The film outer package 10 is composed of two films 10-1 and 10-2 in this example. The films 10-1 and 10-2 are heat-sealed to each other in the peripheral portion of the battery element 20 and hermetically sealed. In FIG. 1, the positive electrode tab 51 and the negative electrode tab 52 are drawn out in the same direction from one short side of the film outer package 10 hermetically sealed in this manner.

Of course, the electrode tabs may be drawn out from different two sides respectively. In addition, regarding the arrangement of the films, in FIG. 1 and FIG. 2, an example in which a cup portion is formed in one film 10-1 and a cup portion is not formed in the other film 10-2 is shown, but other than this, an arrangement in which cup portions are formed in both films (not illustrated), an arrangement in which a cup portion is not formed in either film (not illustrated), and the like may also be adopted.

<Method for Manufacturing Secondary Battery>

The lithium ion secondary battery according to the present embodiment can be manufactured by a conventional method. An example of a method for manufacturing a secondary battery will be described taking a stacked laminate type lithium ion secondary battery as an example. First, in the dry air or an inert atmosphere, the positive electrode and the negative electrode are placed to oppose to each other via a separator to form an electrode element. Next, this electrode element is accommodated in an outer package (container), an electrolyte solution is injected, and the electrodes are impregnated with the electrolyte solution. Thereafter, the opening of the outer package is sealed to complete the secondary battery.

<Assembled Battery>

A plurality of the lithium ion secondary batteries according to the present embodiment may be combined to form an assembled battery. The assembled battery may be configured by connecting two or more lithium ion secondary batteries according to the present embodiment in series or in parallel or in combination of both. The connection in series and/or parallel makes it possible to adjust the capacitance and voltage freely. The number of the lithium ion secondary batteries included in the assembled battery can be set appropriately according to the battery capacity and output.

<Vehicle>

The lithium ion secondary battery or the assembled battery according to the present embodiment can be used in vehicles. Vehicles according to the present embodiment include hybrid vehicles, fuel cell vehicles, electric vehicles (besides four-wheel vehicles (cars, commercial vehicles such as trucks and buses, light automobiles, etc.), two-wheeled vehicle (bike) and tricycle), and the like. The vehicles according to the present embodiment are not limited to automobiles, and the battery may be a variety of power source of other vehicles, such as a moving body like a train, a ship, a submarine or a satellite.

EXAMPLES

Abbreviations used in these examples have following meanings.

Epo-A: 3,4-epoxycyclohexylmethyl(3,4-epoxy)cyclohexane carboxylate

Epo-B: 1,2-epoxydodecane

Epo-C: epsilon-caprolactone-modified 3,4-epoxycyclohexylmethyl 3',4'-epoxycyclohexane carboxylate Epo-Y: epoxylated butanetetracarboxylate tetrakis(3-cyclohexenylmethyl) modified epsilon-caprolactone FEC: fluoroethylene carbonate MMDS: methylene methane disulfonate NMP: N-methylpyrrolidone (Preparation of Binder 1)

Into a 2 L-volume reaction tank equipped with a stirrer, a thermometer, a nitrogen introducing tube, a reflux condenser and a dropping funnel, there were charged 768 g of water and 12 g of anhydrous sodium sulfate. Nitrogen gas was blown thereto to deoxidize the system. Subsequently, 1 g of partially saponified polyvinyl alcohol (saponification degree: 88%) and 1 g of lauryl peroxide were further charged. The inside temperature of the reaction tank was increased to 60° C. Thereafter, 51.8 g (0.602 mol) of methyl acrylate and 207.2 g (2.409 mol) of vinyl acetate were dropped through the dropping funnel over 4 hours, and then the inside temperature was maintained at 65° C. for 2 hours. Thus, the reaction was completed. Thereafter, the solid content was filtered off to obtain a vinyl acetate/methyl acrylate copolymer.

Into the same type of a reaction tank, the obtained vinyl acetate/methyl acrylate copolymer was charged together with 450 g of methanol, 420 g of water and 132 g (3.3 mol)

of sodium hydroxide. A saponification reaction was performed under stirring at 30° C. for 3 hours to convert the vinyl acetate/methyl acrylate copolymer to a vinyl alcohol/sodium acrylate copolymer. After the termination of the saponification reaction, the reaction liquid was filtered, and the obtained solid content was washed with methanol and dried at 70° C. for 6 hours. Thereafter, the solid content was pulverized in a jet mill (LJ, produced by Nippon Pneumatic Mfg. Co., Ltd.) to obtain the vinyl alcohol/sodium acrylate copolymer (Binder 1) in the form of fine powder.
(Preparation of Binder 2)

Into a 500 mL five-neck separable flask equipped with a thermometer, a stirrer and a nitrogen introducing tube, 5.71 g (0.050 mol) of 1,4-cyclohexanediamine (trans-isomer ratio 99% or more), 7.11 g (0.050 mol) of 1,4-bis(aminomethyl) cyclohexane (trans-isomer ratio 84%) and 230 g of N,N-dimethylacetamide were added under stirring conditions to prepare a diamine solution. Furthermore, into the diamine solution, 31.0 g (0.100 mol) of bis(3,4-dicarboxyphenyl) ether dianhydride in the form of powder was introduced thereto under stirring conditions, and then the separable flask was bathed in an oil bath kept at 90° C. for 1 hour. The reaction mixture, which was ununiform at the beginning, turned into a transparent solution with the progress of the reaction. Then the transparent solution was diluted with NMP to obtain a 15 weight % polyamic acid solution (Binder 2).

Example 1

(Negative Electrode)

Silicon monoxide having an average particle size of 10 µm in which the surface was coated with carbon by a chemical vapor deposition (CVD) method, and artificial graphite were used as negative electrode active materials. Hereinafter, this silicon monoxide having a carbon coating is abbreviated to silicon oxide or SiO. A negative electrode active material comprising SiO and artificial graphite (mixing weight ratio was SiO/artificial graphite=70/30), acetylene black and Binder 1 were mixed at a weight ratio of 95:1:4 to prepare a negative electrode mixture. Then pure water was added to the negative electrode mixture to prepare a negative electrode slurry. The negative electrode slurry was applied to a 15 µm thick Cu0.2Sn foil using a doctor blade, and then dried at 80° C. for 5 minutes. Thereafter, it was further dried at 80° C. for 1 hour under reduced pressure to remove moisture, and then a press treatment was conducted to complete a negative electrode. To this negative electrode, a nickel negative electrode terminal for drawing electric charge was welded.
(Positive Electrode)

Lithium cobalt oxide, carbon black and polyvinylidene fluoride were weighed at a weight ratio of 95:2:3. These were mixed with NMP using a homogenizer to prepare a positive electrode slurry. The positive electrode slurry was applied to a 15 µm thick aluminum foil using a doctor blade and heated at 120° C. for 5 minutes to remove NMP, and thus a positive electrode was produced. To this positive electrode, an aluminum positive electrode terminal for drawing electric charge was welded.
(Electrode Stack)

The obtained negative electrode and positive electrode were stacked via a polyolefin separator to produce an electrode element.
(Electrolyte Solution)

Ethylene carbonate (EC) and diethyl carbonate (DEC) were mixed at a volume ratio of EC/DEC=30/70 to prepare an electrolyte solvent. Into this, $LiPF_6$ as a supporting salt and Epo-A as an additive were respectively added to prepare an electrolyte solution. The concentration of $LiPF_6$ in the electrolyte solution was 1.0 mol/L. The concentration of Epo-A in the electrolyte solution was 0.02 mol/L.
(Production of Battery)

The obtained electrode element was packaged with a laminate film, and the electrolyte solution was injected thereto. Subsequently, the laminate film was thermally fused and sealed while the pressure was reduced, and a flat plate type lithium ion secondary battery was fabricated.
(Evaluation of Battery)

The obtained flat plate type lithium ion secondary battery was charged and discharged in the range of 4.2 V to 2.5 V at 25° C. using a charge/discharge tester (ACD-100M: made by ASKA Electronics Co. Ltd.). The charge was performed in a CCCV mode in which the battery was charged at a constant current of 1 C up to 4.2 V and at a constant voltage for 1 hour after the voltage reached 4.2 V. The discharge was performed in a CC mode in which the battery was discharged at a constant current of 1 C, and the initial discharge capacity was measured. As used herein, 1 C means a current value at which the discharge of a fully charged battery is completed in just 1 hour. In this way, 50 cycles of charge/discharge were performed, and the discharge capacity at the 50th cycle was measured. The ratio of the discharge capacity at the 50th cycle to the initial discharge capacity (50 dc/1dc) and the ratio of the thickness of the battery after 50 cycles to the thickness of the battery before the initial charge were calculated. The results are shown in Table 1.

Example 2

A battery was produced and evaluated in the same manner as in Example 1 except that the mixing weight ratio of the negative electrode active materials was SiO/artificial graphite=30/70. The results are shown in Table 1.

Example 3

A battery was produced and evaluated in the same manner as in Example 1 except that the addition amount of Epo-A in the electrolyte solution was 0.01 mol/L. The results are shown in Table 1.

Example 4

A battery was produced and evaluated in the same manner as in Example 1 except that the addition amount of Epo-A in the electrolyte solution was 0.01 mol/L, and FEC was further added to the electrolyte solution in an amount of 0.1 mol/L. The results are shown in Table 1.

Example 5

A battery was produced and evaluated in the same manner as in Example 1 except that the addition amount of Epo-A in the electrolyte solution was 0.01 mol/L, and MMDS was further added to the electrolyte solution in an amount of 0.005 mol/L. The results are shown in Table 1.

Example 6

A battery was produced and evaluated in the same manner as in Example 1 except that the addition amount of Epo-A in the electrolyte solution was 0.06 mol/L. The results are shown in Table 1.

Example 7

A battery was produced and evaluated in the same manner as in Example 3 except that the electrolyte additive was changed from Epo-A to Epo-C. The results are shown in Table 1.

Example 8

A battery was produced and evaluated in the same manner as in Example 3 except that the electrolyte additive was changed from Epo-A to Epo-Y. The results are shown in Table 1.

Example 9

SiO and Binder 2 were mixed such that the weight ratio of SiO and the polyamic acid was 88:12. NMP was added thereto to prepare a negative electrode slurry. The negative electrode slurry was applied to a 15 μm thick Cu0.2Sn foil using a doctor blade, and then dried at 120° C. for 5 minutes. Thereafter, it was dried at 150° C. for 1 hour under reduced pressure to complete a negative electrode. To this negative electrode, a nickel negative electrode terminal for drawing electric charge was welded. Except for the use of the produced negative electrode, a battery was produced and evaluated in the same manner as in Example 5. The results are shown in Table 1.

Comparative Example 1

A battery was produced and evaluated in the same manner as in Example 1 except that Epo-A was not added to the electrolyte solution. The results are shown in Table 1.

Comparative Example 2

A battery was produced and evaluated in the same manner as in Comparative example 1 except that the mixing weight ratio of the negative electrode active materials was SiO/artificial graphite=30/70. The results are shown in Table 1.

Comparative Example 3

A battery was produced and evaluated in the same manner as in Example 1 except that the electrolyte additive was changed from Epo-A to Epo-B. The results are shown in Table 1.

Comparative Example 4

A battery was produced and evaluated in the same manner as in Example 1 except that Epo-A was not added to the electrolyte solution, and FEC was added in an amount of 0.1 mol/L. The results are shown in Table 1.

Comparative Example 5

A battery was produced and evaluated in the same manner as in Example 1 except that Epo-A was not added to the electrolyte solution, and MMDS was added in an amount of 0.005 mol/L. The results are shown in Table 1.

Comparative Example 6

A battery was produced and evaluated in the same manner as in Example 9 except that Epo-A was not added to the electrolyte solution. The results are shown in Table 1.

TABLE 1

| | Proportion of SiO in negative electrode active material (wt %) | Binder | Epoxy additive | | Another additive | | Capacity retention rate at $50^{th}$ cycle (%) | Thickness after 50 cycles/ thickness before initial charge (%) |
|---|---|---|---|---|---|---|---|---|
| | | | Type | Concentration in electrolyte solution (mol/L) | Type | Concentration in electrolyte solution (mol/L) | | |
| Example 1 | 70 | Binder 1 | Epo-A | 0.02 | — | — | 92 | 119 |
| Example 2 | 30 | Binder 1 | Epo-A | 0.02 | — | — | 96 | 112 |
| Example 3 | 70 | Binder 1 | Epo-A | 0.01 | — | — | 91 | 120 |
| Example 4 | 70 | Binder 1 | Epo-A | 0.01 | FEC | 0.1 | 93 | 118 |
| Example 5 | 70 | Binder 1 | Epo-A | 0.01 | MMDS | 0.005 | 95 | 115 |
| Example 6 | 70 | Binder 1 | Epo-A | 0.06 | — | — | 91 | 113 |
| Example 7 | 70 | Binder 1 | Epo-C | 0.01 | — | — | 90 | 122 |
| Example 8 | 70 | Binder 1 | Epo-Y | 0.01 | — | — | 88 | 118 |
| Example 9 | 100 | Binder 2 | Epo-A | 0.01 | MMDS | 0.005 | 98 | 113 |
| Comparative example 1 | 70 | Binder 1 | — | — | — | — | 87 | 134 |
| Comparative example 2 | 30 | Binder 1 | — | — | — | — | 94 | 126 |
| Comparative example 3 | 70 | Binder 1 | Epo-B | 0.02 | — | — | 93 | 125 |
| Comparative example 4 | 70 | Binder 1 | — | — | FEC | 0.1 | 89 | 127 |
| Comparative example 5 | 70 | Binder 1 | — | — | MMDS | 0.005 | 91 | 123 |
| Comparative example 6 | 100 | Binder 2 | — | — | MMDS | 0.005 | 97 | 115 |

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INDUSTRIAL APPLICABILITY

The lithium ion secondary battery according to the present embodiment can be utilized in, for example, all the industrial fields requiring a power supply and the industrial fields pertaining to the transportation, storage and supply of electric energy. Specifically, it can be used in, for example, power supplies for mobile equipment such as cellular phones and notebook personal computers; power supplies for electrically driven vehicles including an electric vehicle, a hybrid vehicle, an electric motorbike and an electric-assisted bike, and moving/transporting media such as trains, satellites and submarines; backup power supplies for UPSs; and electricity storage facilities for storing electric power generated by photovoltaic power generation, wind power generation and the like.

EXPLANATION OF SYMBOLS 10 film outer package
20 battery element
25 separator
30 positive electrode
40 negative electrode

The invention claimed is:
1. A lithium ion secondary battery comprising
an electrolyte solution comprising an additive comprising an epoxy compound comprising two or more epoxy groups, wherein the epoxy compound comprises an epoxycyclohexyl group represented by following structural formula (21):

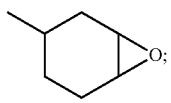

Formula (21)

and
a negative electrode comprising an active material and a binder comprising a polymer selected from the group consisting of polyvinyl alcohol, poly(meth)acrylic acid, poly(meth)acrylate, polyimide having a monomer unit which is not ring-closed, polyamide-imide having a monomer unit which is not ring-closed, and a copolymer of vinyl alcohol and sodium acrylate.
2. The lithium ion secondary battery according to claim 1, wherein the negative electrode active material comprises a silicon material.
3. The lithium ion secondary battery according to claim 2, wherein the silicon material is particles coated with a carbon material.
4. The lithium ion secondary battery according to claim 1, wherein the epoxy compound is selected from the group consisting of 3,4-epoxycyclohexylmethyl(3,4-epoxy)cyclohexane carboxylate, and epsilon-caprolactone-modified 3,4-epoxycyclohexylmethyl 3',4'-epoxycyclohexane carboxylate.
5. The lithium ion secondary battery according to claim 1, wherein the electrolyte solution further comprises a second additive selected from the group consisting of methylene methane disulfonate represented by following formula (1):

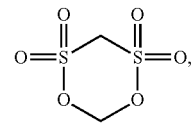

(1)

ethylene methane disulfonate, propane methane disulfonate, 1,3-propane sultone, propene sultone, butane sultone, sulfolane, fluoroethylene carbonate represented by the following formula (2):

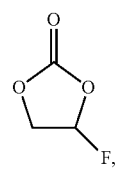

(2)

trifluoromethyl propylene carbonate, chloroethylene carbonate, vinylene carbonate, vinyl ethylene carbonate, phenylene carbonate, allyl methyl carbonate, maleic anhydride, succinic anhydride, phthalic anhydride, succinimide, lithium bisoxalate borate represented by the following formula (3):

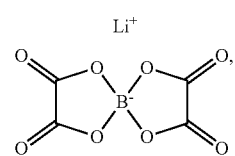

(3)

lithium difluoro oxalate borate, ethylene sulfite, vinyl ethylene sulfite, butylene sulfite, dimethyl sulfite, diethyl sulfite, vinyl acetate and divinyl adipate, dimethyl glycolide, tetramethyl glycolide, and cyanofuran.
6. A vehicle equipped with the lithium ion secondary battery according to claim 1.
7. A method for manufacturing a lithium ion secondary battery, comprising the steps of:
fabricating an electrode element by stacking a positive electrode and a negative electrode via a separator, and enclosing the electrode element and an electrolyte solution into an outer package,
wherein the electrolyte solution comprises an additive comprising an epoxy compound comprising two or more epoxy groups, wherein the epoxy compound comprises an epoxycyclohexyl group represented by following structural formula (21):

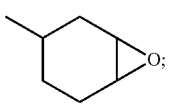

Formula (21)

and
the negative electrode comprises an active material and a binder comprising a polymer selected from the group consisting of polyvinyl alcohol, poly(meth)acrylic acid, poly(meth)acrylate, polyimide having a monomer unit which is not ring-closed, polyamide-imide having a monomer unit which is not ring-closed, and a copolymer of vinyl alcohol and sodium acrylate.

* * * * *